United States Patent
Yau et al.

(10) Patent No.: US 6,876,757 B2
(45) Date of Patent: Apr. 5, 2005

(54) FINGERPRINT RECOGNITION SYSTEM

(75) Inventors: Shing-Tung Yau, Belmont, MA (US);
Xianfeng Gu, Cambridge, MA (US);
Zhiwu Zhang, Malden, MA (US)

(73) Assignee: Geometric Informatics, Inc.,
Somerville, MA (US)

( * ) Notice: Subject to any disclaimer, the term of this patent is extended or adjusted under 35 U.S.C. 154(b) by 498 days.

(21) Appl. No.: 10/156,447

(22) Filed: May 28, 2002

(65) Prior Publication Data

US 2003/0039382 A1 Feb. 27, 2003

Related U.S. Application Data

(60) Provisional application No. 60/293,487, filed on May 25, 2001, and provisional application No. 60/338,949, filed on Oct. 22, 2001.

(51) Int. Cl.[7] .............................................. G06K 9/00
(52) U.S. Cl. .................................. 382/125; 340/5.83
(58) Field of Search ................................ 382/115, 124, 382/125; 283/68, 69, 70; 340/5.52, 5.53, 5.8, 5.81, 5.82, 5.83; 396/15; 356/71

(56) References Cited

U.S. PATENT DOCUMENTS

| | | | | |
|---|---|---|---|---|
| 4,135,147 A | * | 1/1979 | Riganati et al. ............. | 382/125 |
| 4,185,270 A | * | 1/1980 | Fischer, II et al. .......... | 382/125 |
| 4,646,352 A | * | 2/1987 | Asai et al. ................... | 382/125 |
| 4,790,564 A | * | 12/1988 | Larcher et al. ............... | 283/69 |
| 4,944,021 A | * | 7/1990 | Hoshino et al. ............. | 382/125 |
| 4,947,442 A | * | 8/1990 | Tanaka et al. ............... | 382/125 |
| 5,040,223 A | | 8/1991 | Kamiya et al. ................ | 382/4 |
| 5,109,428 A | | 4/1992 | Igaki et al. ..................... | 382/5 |
| 5,631,971 A | | 5/1997 | Sparrow ...................... | 382/125 |
| 5,631,972 A | | 5/1997 | Ferris et al. ................ | 382/125 |
| 5,659,626 A | | 8/1997 | Ort et al. .................... | 382/125 |
| 5,917,928 A | | 6/1999 | Shpuntov et al. ........... | 382/124 |
| 5,982,914 A | | 11/1999 | Lee et al. ..................... | 382/124 |
| 6,049,621 A | | 4/2000 | Jain et al. ..................... | 382/125 |
| 6,263,091 B1 | | 7/2001 | Jain et al. ..................... | 382/125 |
| 6,314,196 B1 | | 11/2001 | Yamaguchi et al. ......... | 382/125 |
| 6,763,127 B1 | * | 7/2004 | Lin et al. ..................... | 382/125 |
| 2002/0031244 A1 | * | 3/2002 | Rozenberg et al. .......... | 382/124 |
| 2002/0031245 A1 | * | 3/2002 | Rozenberg et al. .......... | 382/125 |

* cited by examiner

*Primary Examiner*—Samir Ahmed
(74) *Attorney, Agent, or Firm*—Weingarten, Schurgin, Gagnebin & Lebovici LLP

(57) ABSTRACT

A method of analyzing and recognizing fingerprint images that utilizes vector processing of a vector field that is defined as the tangential vector of the fingerprint ridge curves is disclosed. The raw fingerprint image is divided into blocks, filtered to remove noise, and the orientation direction of each block is found. This allows the ridge curves to be enhanced and approximated by piece-wise linear approximations. The piece-wise linear approximations to the ridge curves allow the minutiae to be extracted and classified and a fingerprint minutiae template to be constructed. An enrollment process gathers multiple fingerprint images, creates fingerprint minutiae templates corresponding to the acquired fingerprint images, and stores the templates and other data associated with the respective individual or the enrolled fingerprint in a fingerprint database. In an identification process, an unknown raw fingerprint image is obtained via a fingerprint scanner and processed similarly to the enrollment process such that the fingerprint minutiae template of the unknown fingerprint is compared to one or more previously enrolled fingerprint minutiae templates. The identity of the individual associated with the unknown fingerprint is thereby ascertained. In addition, live finger detection can be accomplished in conjunction with the verification or identification process through analysis of the fingerprint image thus enhancing the security of the overall system.

68 Claims, 12 Drawing Sheets

FINGERPRINT RECOGNITION SYSTEM

CROSS REFERENCE TO RELATED APPLICATIONS

This application claims priority under 35 U.S.C. §119(e) to U.S. Provisional Patent Application Ser. No. 60/293,487 filed May 25, 2001 and U.S. Provisional Patent Application Ser. No. 60/338,949 filed Oct. 22, 2001.

STATEMENT REGARDING FEDERALLY SPONSORED RESEARCH OR DEVELOPMENT

N/A

BACKGROUND OF THE INVENTION

A biometric is defined as a biological characteristic or trait that is unique to an individual and that can be accurately measured. A biometric that can be stored and accessed in an efficient manner can be used to identify an individual or to verify the identity of an individual. A biometric commonly used to identify human beings is one or more fingerprints belonging to the particular human being.

Fingerprint identification of a human being consists of two stages: enrollment and verification/identification. Enrollment of a fingerprint involves taking a fingerprint image (FPI) of an individual and storing the FPI itself or a plurality of data that is representative of the FPI in an FPI database. Identification of a fingerprint involves taking an FPI of an unknown individual and comparing the unknown FPI to the FPIs or FPI data that is stored in the FPI database. An identification is made when a match between the unknown FPI and an FPI stored in the FPI database is found that has a sufficient reliability that the probability of a false positive is below a predetermined threshold. Fingerprint verification or authentication matches an individual to a fingerprint that has been previously enrolled by that individual. Thus, identification involves searching for a match between a single unknown FPI with many stored FPIs. The verification process involves the matching an unknown or unconfirmed fingerprint minutiae template to a single previously enrolled fingerprint minutia template. Accordingly, the verification process is a one-to-one matching technique.

The use of biometrics to restrict access to secure entities such as computer networks, cryptographic keys, sensitive data, and physical locations is well known. In addition, smart cards, cards that have a biometric, such as a fingerprint, encoded thereon can be used to provide transaction security as well. A smart card allows a user to provide the biometric encoded on the card, wherein the encoded biometric data is compared to the biometric measured on the individual. In this way, a smartcard can positively authenticate the identity of the smartcard user.

However, traditional FPI data is based on the set of singularities that can be classified according to the type of singularity, e.g., deltas, arches, or whorls. In addition, FPIs contain fingerprint minutiae that are the end point of a ridge curve or a bifurcation point of a ridge curve. FPI images can be classified and matched according to data associated with the fingerprint minutiae. This data can include the position of the minutiae, the tangential direction of the minutiae, and the distance to other minutiae. These types of FPI data can lead to a high false acceptance or identification rate when the unknown FPI has only a few minutiae or if the unknown FPI is only a partial FPI that may or may not include the number of minutiae needed to accurately verify or identify the unknown FPI.

Therefore what is needed is a method and apparatus to collect, analyze, and store FPI data such that an unknown or unverified FPI can be accurately verified or identified in the FPI or whether the FPI is only a partial print.

BRIEF SUMMARY OF THE INVENTION

A method of analyzing and recognizing fingerprint images that utilizes vector processing of a vector field that is defined as the tangential vector of the fingerprint ridge curves is disclosed. The raw fingerprint image is divided into blocks, each block is filtered to remove noise and the orientation direction of each block is found. This allows the ridge curves to be enhanced and approximated by piece-wise linear approximations. The piece-wise linear approximations to the ridge curves allow the minutiae to be extracted and classified and a fingerprint minutiae template to be constructed. An enrollment process gathers multiple fingerprint images, creates fingerprint minutiae templates corresponding to the fingerprint images, and stores the templates and other data associated with the respective individual or the enrolled fingerprint in a fingerprint database. In an identification or verification process an unknown raw fingerprint image is obtained via a fingerprint scanner and processed similarly to the enrollment process described above. The fingerprint minutiae template of the unknown fingerprint is compared to one or more previously enrolled fingerprint minutiae templates to identify or verify the identity of the individual associated with the unknown fingerprint. In addition, live finger detection can be accomplished in conjunction with the identification or verification processes through analysis of the fingerprint image thus enhancing the security of the overall system.

Other forms, features, and aspects of the above-described methods and system are described in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

A fingerprint image (FPI) acquisition, analysis, storage, and recognition system is disclosed in which FPIs are acquired and a fingerprint template based upon the acquired FPI is created. The fingerprint template is stored and can be used to both identify an unknown FPI and to verify the identity of an FPI.

Figure 1:
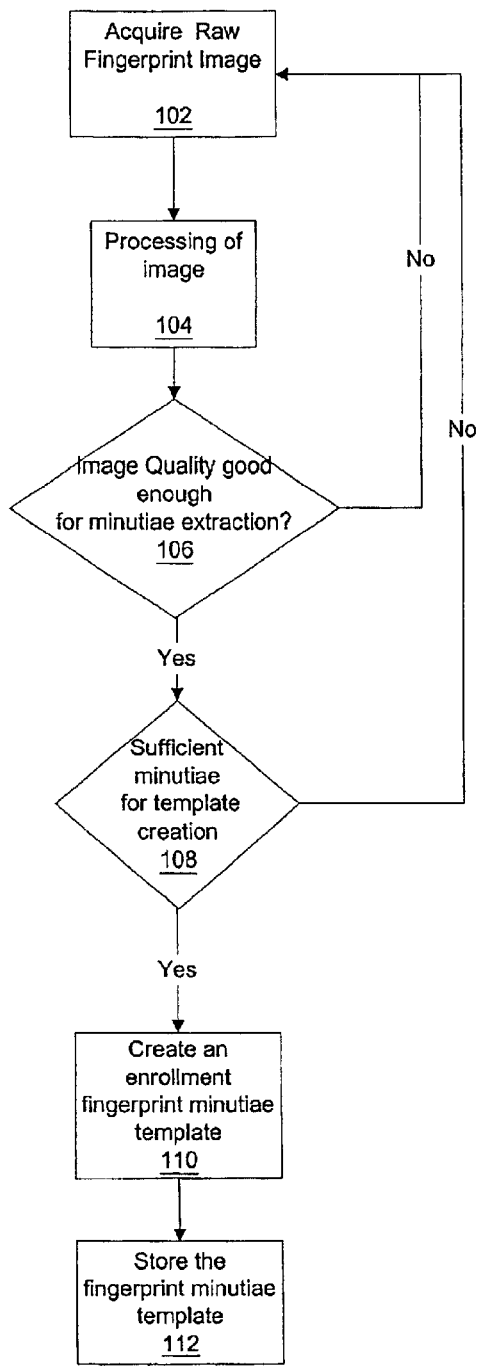
FIG. 1 is a flow chart of a method for acquiring and enrolling fingerprint minutiae templates.

FIG. 1 is block diagram of the enrollment process used to acquire an FPI and to store the corresponding fingerprint template. In particular, the raw FPI is acquired from a fingerprint sensor or scanner or a scanned FPI, as depicted in step 102. As used herein a raw FPI is defined as an original fingerprint image captured by a fingerprint sensor or scanner or a raw fingerprint can be a digitally scanned image of a paper and ink fingerprint. A raw FPI includes a plurality of ridge curves and valleys interspersed between the various ridge curves corresponding to the ridges and valleys of the original fingerprint. The ridge curves and valleys form various structures that include singularities such as whorls, deltas, arches, and also include fingerprint minutiae that are the ending point of ridge curves or bifurcation points of ridge curves. Each of the minutiae has data associated therewith that is indicative of the position of the minutiae, the tangential direction of the minutiae, and the type of minutiae.

The raw FPI is processed to enhance the contrast between the ridge curves and valleys contained in the FPI, as depicted in step 104. As depicted in step 106, the quality of the enhanced FPI is evaluated and if the quality of the FPI is sufficiently high, the minutiae from the FPI are extracted and control is passed to step 108. If not, control passes to step 102 and another FPI is acquired. As depicted in step 108, the number of minutia are examined and if there are sufficient minutiae, control is passed to step 110 where the minutiae are extracted from the FPI and an FPI template is formed. In general the number of minutiae that are required is dependent upon the level of security that is required. A low security application may only require six minutiae that are able to be matched, while a high security application may require 12 or more minutiae that are able to be matched.

As used herein a fingerprint template is an undirected graph of minutiae extracted from an FPI. Each node in the fingerprint template is an individual minutia and each connecting segment in the graph connects two minutiae (i.e., graph nodes). Each connecting segment also includes data associated therewith, for example, cross points of the connecting segment with ridge curves, and the angles between the direction of the connecting segment and the tangential direction of the ridge curve at the intersecting point. In addition, the template can include data on the core and deltas associated with the FPI. For example, the FPI template can include data associated with a core or delta such as the position and direction of respective core and delta.

The fingerprint template is associated with the individual and then stored in a fingerprint template database, as depicted in step 112. If there are a not sufficient number of minutiae, control passes to step 102 and another RAW FPI is acquired.

Figure 2:
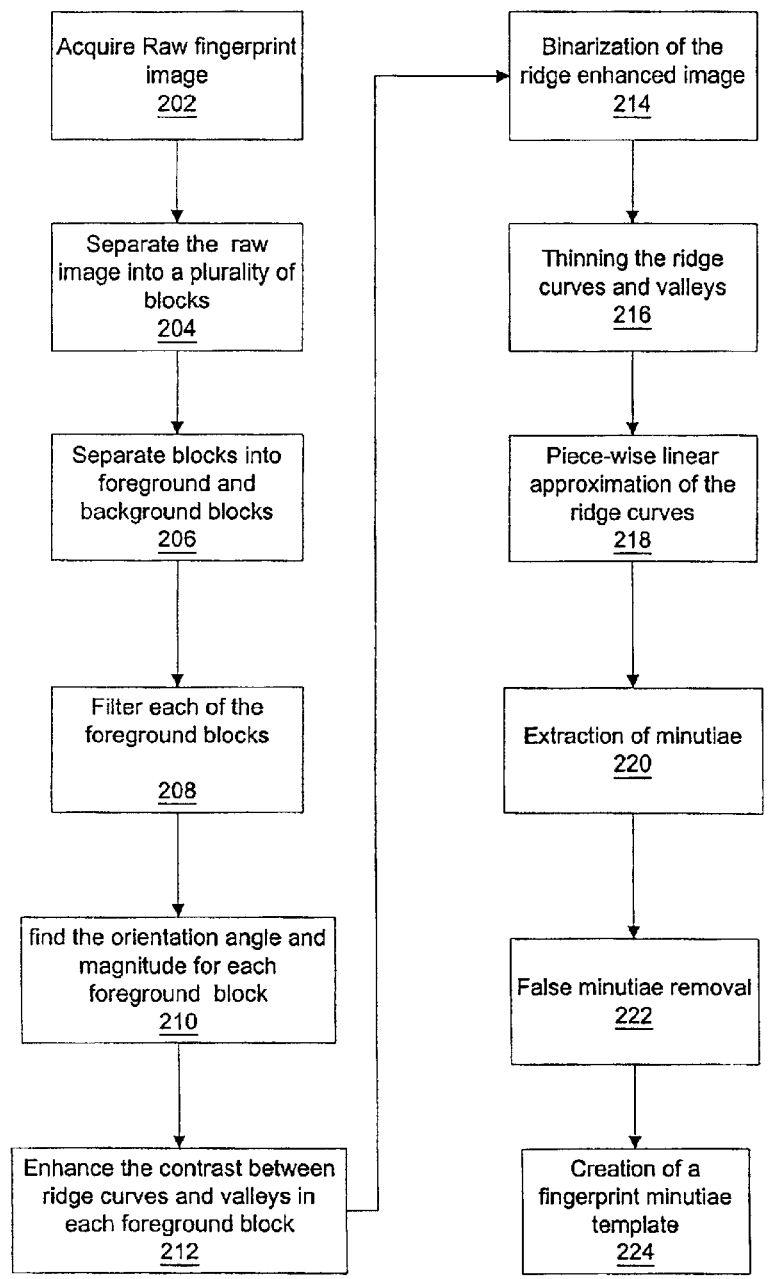
FIG. 2 is a flow chart of a method for extracting minutiae from a raw fingerprint image and forming a fingerprint minutiae template.

FIG. 2 is a flowchart that describes the various steps necessary to perform the image processing of the raw FPI, the minutiae extraction, and the FPI template formation. The steps depicted in FIG. 2 can be used to process raw FPIs for enrollment purposes, and raw FPIs for identification or identity verification purposes.

As depicted in FIG. 2, a raw FPI is acquired from a fingerprint scanner or from scanning a paper and ink fingerprint, or from a previously digitized FPI, as depicted in step 202. The raw FPI is separated into an array of non-overlapping blocks, as depicted in step 204. The block size can be selected based upon various parameters such as the size of the FPI, the amount of data contained therein, and the processor speed. Preferably, the block size is selected as a function of the resolution of the FPI such that within each block, the ridge curves can be approximated by straight lines. In one preferred embodiment, the block size is given by R/25 and rounded to the closest power of 2, where R is the resolution of the FPI in dots/inch. In the ilustrated embodiment, the resolution of a typical fingerprint scanner is approximately 500 dpi and is divided into 256 blocks in a 16×16 block pattern of equal size blocks. In another embodiment, the block size may be varied within an FPI depending upon the size of the object within the FPI that is to be processed.

The blocked image is processed to provide one or more regions of interest, as depicted in step 206. A region of interest in the FPI is a portion or portions of the FPI containing the ridge curves and valleys of the FPI, the remaining portion or portions of the FPI do not contain any significant fingerprint data. To determine the regions of interest, the FPI is separated into foreground blocks and background blocks, as depicted in step 206. In one embodiment, the mean and variance of the pixel intensities are determined for each block. A predetermined mean threshold and variance threshold are selected and a k-nearest neighbor clustering algorithm is used to classify all blocks within the K-nearest neighbors as a foreground block or a background block. In a preferred embodiment, a convex hull is formed that includes all of the blocks determined to be foreground blocks. A second check of all background blocks is made to ensure that noise or other interference has not inadvertently switched a foreground block into a background block. A check is made to determine if the center of a previously determined background block is contained within the convex hull formed by the foreground blocks. If so, the background block is converted into a foreground block.

The regions of interest in the FPI are filtered to remove random noise in order to form a clearer filtered mage, as depicted in step 208. Random noise is typically high frequency noise and accordingly a low pass filter is used to smooth out the high frequency noise from the foreground blocks of the blocked image. In one embodiment, the low pass filter is a Gaussian filter. The Gaussian filter can be a 2-dimensional filter mask that when convolved with each pixel, within each of the foreground blocks, removes the high frequency noise contained within the FPI.

The orientation angle and magnitude of each of the foreground blocks in the filtered image are found, forming an orientation image, as depicted in step 210. In general, the orientation angle and magnitude are found by determining the gradient in the x and y directions. In one embodiment, a Sobel differential operator is applied to each foreground block to determine the orientation angle and amplitude. In the event that the orientation amplitude is below a predetermined threshold, a Hough transformation is used to estimate the orientation angle.

The contrast between the ridge curves and the valleys in the orientation image is increased forming a ridge-enhanced FPI, as depicted in step 212. In particular, a plurality of directional filters each corresponding to a foreground block smoothes out the differences along the ridge curves and intensifies the contrast between the ridge curves and valleys within the corresponding block. In one embodiment, the directional filter is a 2-dimensional mask having an x and y direction. The y direction of the mask is intended to amplify the fingerprint ridge curves and to negatively amplify the valleys. In one embodiment, the directional filter is a Gaussian filter along the ridge direction.

Figure 3:
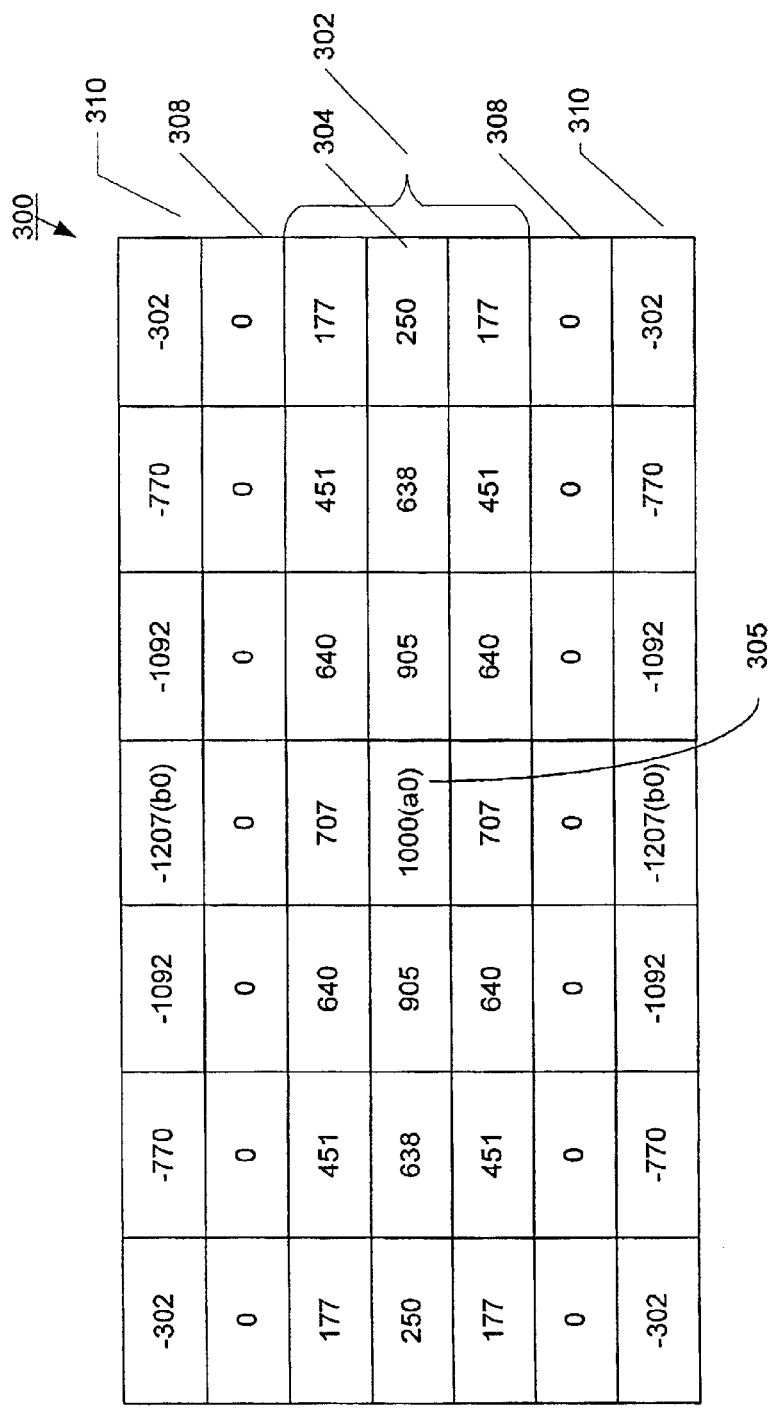
FIG. 3 is a schematic diagram of a direction filter suitable for use in the present fingerprint analysis method.

A directional filter mask is depicted in FIG. 3 in which the filter mask 300 is a square in which the side length is equal to the period of the signal, or the period of the signal plus 1, whichever is an odd number. The middle rows 302 are selected to enhance the ridges, and the side rows 310 are used to negatively amplify the valleys. There may be transition rows 310 between the middle rows 302 and the side rows 308 that have coefficients equal to zero. The center coefficient, $a_0$, 305 of the center row 304 is set to $a_0$ and the coefficients of the center row 304 are cosine tapered to edge values of $a_0/4$ forming a symmetric row. In the illustrated embodiment, $a_0$ is set to 1000 and the center row 304 is cosine tapered to a value of 250 at each edge. The coefficients of the middle rows 302 are cosine tapered from the value of the center row to a value of $a_{0,i}/1.41$, where $a_{0,i}$ is the value of the $i^{th}$ coefficient of the center row 304. The value of each coefficient of the side rows 310 is given by $$b_i = -\frac{1}{2}\left(\sum_{j=1}^{m} a_{i,j}\right)$$

where i is the $i^{th}$ coefficient of the side row and m is the number of middle rows. Once the directional filter mask for a block has been determined, the directional filter mask is convolved with the pixels in the corresponding block.

Referring again to FIG. 2, the ridges and valleys of the ridge-enhanced FPI are then separated into one of two binary values, a first binary value for a ridge pixel and a second binary value for a valley pixel, forming a binary fingerprint image, as depicted in step 214. In particular, the image binarization is accomplished by establishing a binary threshold and comparing the intensity value of each pixel to the binary threshold. A pixel having a pixel value greater than the binary threshold is set to a first value and a pixel having a pixel value less than the binary threshold is set to a second value. In one embodiment in which the maximum pixel intensity is 255, the binary threshold is one-half the maximum pixel intensity or 128. The first value is equal to 255 and the second value is equal to zero.

The ridge curves and valleys of the binary FPI are thinned to a predetermined width, which in the illustrated embodiment is a single pixel forming a thinned image, as depicted in step 216. The thinning may be accomplished with thinning algorithms that are known in the art.

The thinned ridge curves and valleys in the thinned image are approximated by piece-wise linear segments forming a piece-wise linear FPI, as depicted in step 218. The thinned ridge curves are represented by chain code connecting the start and end points of each ridge curve within a corresponding block. A line segment connecting the start and end points of the respective ridge curve is formed and the maximum distance between the line segment and the ridge curve is determined. If this distance is greater than a predetermined maximum value, two line segments approximate the ridge curve. A first line segment is formed from the start point to the point on the ridge curve having the maximum distance from the original line segment. A second line segment is formed from the end point of the first line segment to the end point of the ridge curve. This process is continued iteratively until the distance between the ridge curve and any point on the piece wise linear approximating segments is less than the predetermined minimum value.

The fingerprint minutiae are extracted from the piece-wise linear FPI, as depicted in step 220. In general, minutiae are classified as either ending minutiae or bifurcation minutiae. Ending minutiae are defined as the end point of a ridge curve in an FPI and bifurcation minutiae are defined as a crossing point of two ridge curves in an FPI. In particular, a connection number is computed for each pixel in a corresponding block, wherein the connection number is indicative of whether a pixel is a fingerprint minutia and if so, what type of minutia the corresponding pixel is. The connection number is equal to $$CN = \left(\sum_{i=1}^{7} \frac{1}{2}|P_i - P_{i+1}|\right),$$

where $P_i$ and $P_{i+1}$ are the values of the 8 pixels surrounding the pixel of interest. The connection number corresponds to the properties detailed in Table 1:

TABLE 1

| Connection number, CN, value | Property |
| --- | --- |
| 0 | Pixel is an isolated point |
| 1 | Pixel is an end point |
| 2 | Pixel is a continuing point |
| 3 | Pixel is a branching point |
| 4 | Pixel is a crossing point |

For a CN value of 1 or 3, the angle of the ending point or the branching point to the associated ridge curve is determined. The minutiae type, the x-y position of the minutiae, and the angle of the minutiae associated with the respective ridge curve are determined and stored.

The extracted minutiae are further processed to remove false minutiae leaving true minutiae as depicted in step 222. As can be appreciated, a large number of false minutiae can be created and detected during the processing steps prior to this step. These minutiae may be due to small ridge segments, ridge breaks, boundary minutiae, and noise.

For every minutiae extracted in step 220, the minutiae is analyzed to see if the minutiae belongs to a broken ridge curve, a noisy link, or if the extracted minutiae is a boundary minutiae. A broken ridge curve occurs when two minutiae are within a predetermined distance of one another and the directions of the respective minutiae are opposite to one another. If the number of minutiae within a specified area exceeds a predetermined threshold, the minutiae are considered to be part of a noisy link. If minutiae occur along the boundary of the FPI, it is considered to be boundary minutiae. In the event that the extracted minutiae belong to one of these three classes, the minutiae is deleted from the extracted minutiae list.

A fingerprint minutiae template is then formed from the true minutiae, as depicted in step 224. In particular, a fingerprint minutiae template is an undirected graph in which the true minutiae are the corresponding nodes and line segments connected between two-node points form the edges of the graph. Each of the true minutiae is only connected to other true minutiae within a predetermined distance of it. Data associated with the intersection between a graph edge and any of the ridge curves in the FPI is also stored. This data can include the location of the intersection, i.e., the intersection points, and the angles between the graph edge and tangential direction of the ridge curve.

Figure 4:
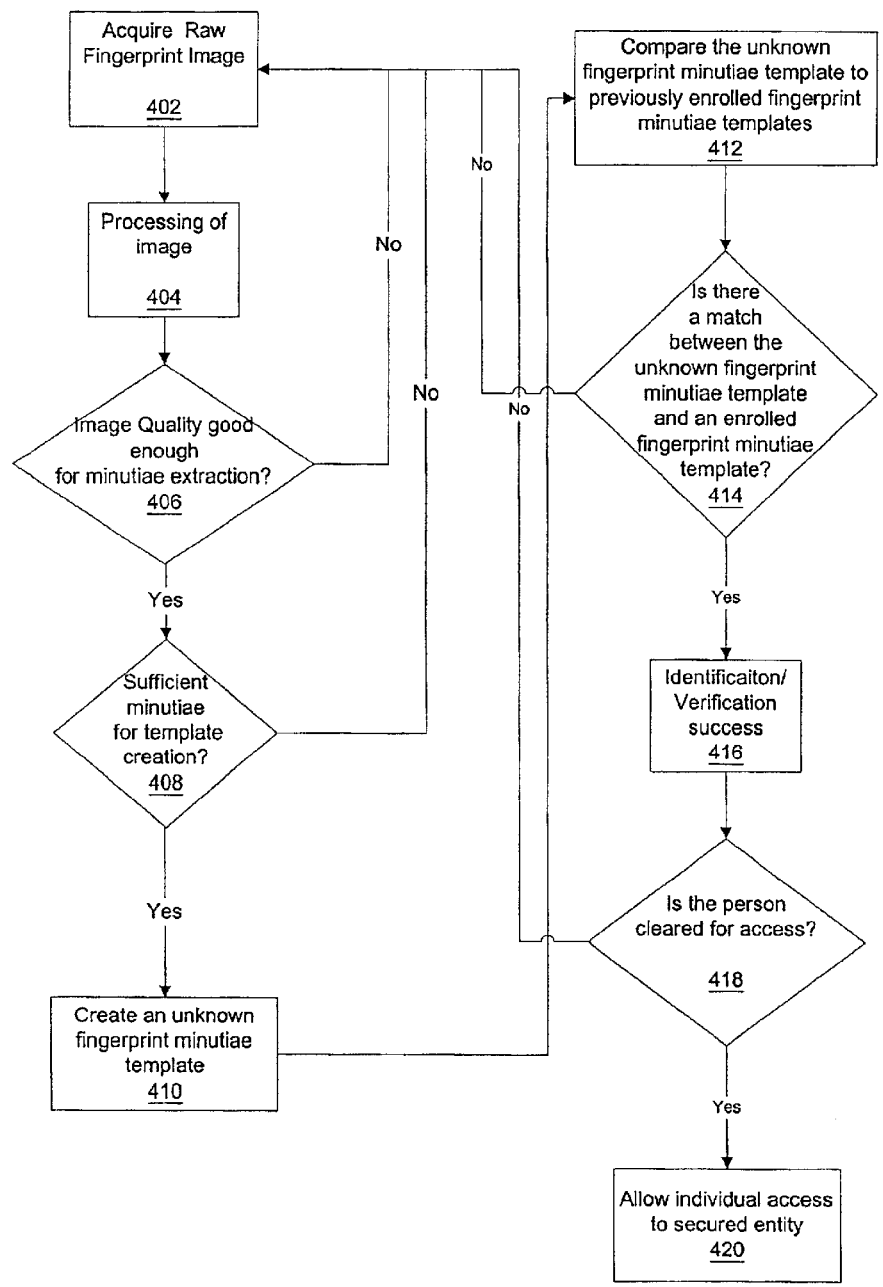
FIG. 4 is a flow chart of a method for identifying/verifying the identity of an individual using the presently described fingerprint analysis method.

FIG. 4 depicts a block diagram of an embodiment of the verification/identification process. A raw FPI is acquired from a finger print sensor or scanner, as depicted in step 402. The acquired FPI is processed, as depicted in step 404, and if the image is suitable for minutiae extraction as depicted in step 406, the number of minutiae that exist in the FPI is determined, as depicted in step 408. If sufficient minutiae exist in the FPI, the minutiae are extracted and a fingerprint minutiae template is formed as described with respect to FIG. 2, as depicted in step 410. If the image is not suitable to extract minutiae then control passes to step 402 and a new raw FPI is acquired.

If the fingerprint minutiae template is formed, one or more of the previously enrolled templates are compared to the fingerprint minutiae template of the raw FPI, as depicted in step 412. In the verification process, a single enrolled template that is known a-priori may be compared to the template of the raw FPI in a one to one matching scheme, where the alleged identity of the individual to be verified is known. In the identification process, many of the enrolled templates are compared to the template of the raw FPI in a one to many matching scheme. As discussed in more detail below, the enrolled templates and the template of the raw FPI may be classified according to various characteristics such as the presence of singularities in the FPI to reduce the number of enrolled fingerprint templates to be searched. The number of minutiae that are matched is compared to a predetermined threshold, as depicted in step 414, and if the number of matched minutiae exceeds the predetermined verification threshold, the enrolled template and the unknown/unverified template of the raw FPI are considered matched, as depicted in step 416. Accordingly, the person is identified or verified as the individual associated with the enrolled template. If the individual associated with the unknown/unverified FPI is cleared for entry into a secure entity such as a computer, a data network, or a physical space, entry is granted as depicted in step 418. Otherwise, control is passed back to step 402 for acquisition of another FPI.

Figure 5:
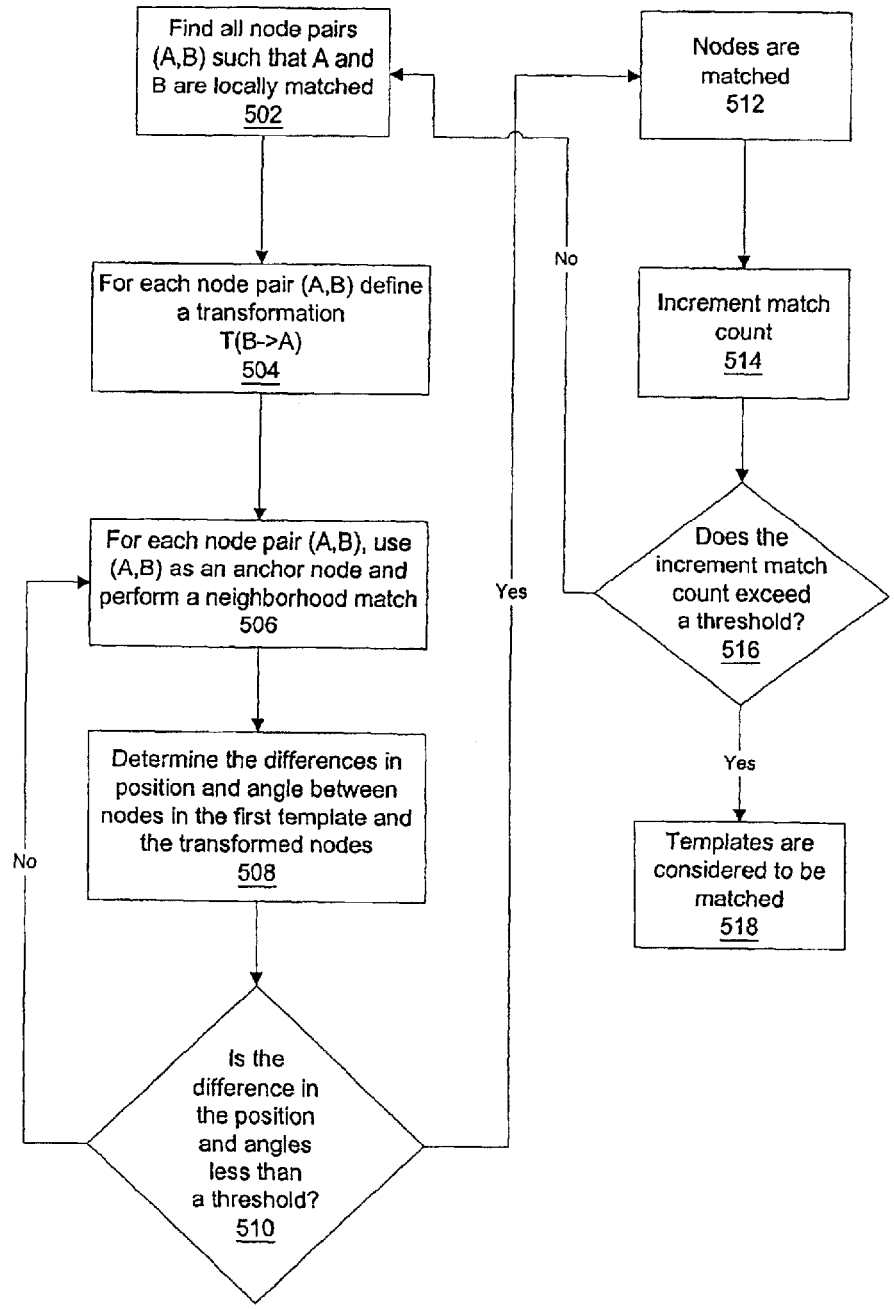
FIG. 5 is a flow chart of a method for comparing an unknown fingerprint minutiae template with a previously enrolled fingerprint minutiae template.

FIG. 5 depicts an embodiment of a matching process suitable for use with the identification/verification methods described herein. Having acquired an enrolled fingerprint template and a fingerprint template to be identified/verified, first find all node pairs (A,B) that are locally matched, as depicted in step 502, where A is a minutiae node from the enrolled template and B is a minutiae node from the template to be identified/verified. For each identified node pair (A,B) a transformation T(B->A) is formed, as depicted in step 504. The transformation T(B->A) is defined as the translation of B to A and the rotation of B necessary to align B to A. Each node pair (A,B) is further used as an anchor node and a neighborhood match is performed in the neighborhood of the anchor node using the corresponding transformation T(B->A), as depicted in step 506. The transformed minutiae nodes in the neighborhood of the node pair (A,B) in each template are compared with one another and if the differences in position and rotation between corresponding minutiae are less than a predetermined matching threshold, the minutiae are considered to be matched, as depicted in step 508, 510, and 512. For each node pair (A,B), the number of matched minutiae are counted, as depicted in step 514. The number of matched minutiae are compared to a matching threshold, as depicted in step 516. If the number of matched minutiae exceeds the matching threshold, the fingerprint templates are considered to be matched, as depicted in step 518, otherwise, control is returned to step 502.

Figure 6:
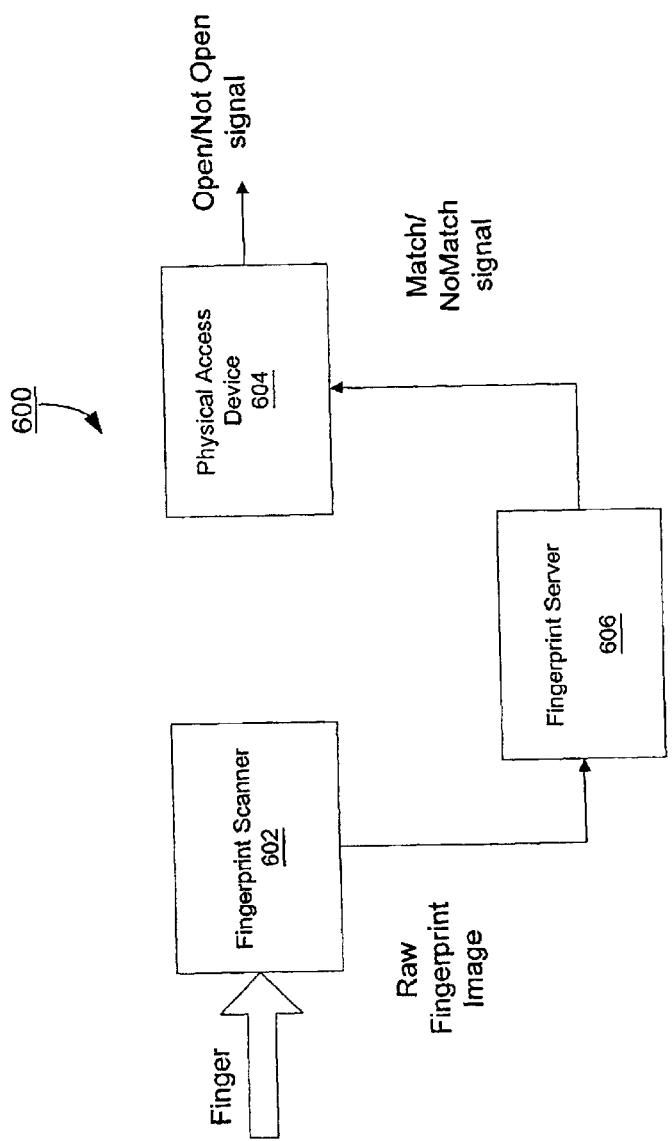
FIG. 6 is block diagram for a system to control physical access using the fingerprint analysis methods described herein.

FIG. 6 depicts a block diagram of a physical access control system 600. A fingerprint scanner 602 is used to scan a fingerprint. The scanned FPI is provided to a fingerprint server 606 that contains fingerprint templates of enrolled individuals. The fingerprint server 606 creates a fingerprint minutiae template of the scanned FPI and compares the template to the previously enrolled templates corresponding to the individuals cleared for access to the secure location. A positive match between the fingerprint minutiae template of the scanned FPI and one of the previously enrolled fingerprint minutiae templates will positively identify the individual if enrolled. The fingerprint server 606 provides for match/no-match indicia to be provided to the physical access device 604 allowing access into the secured area. Note that the actual identity of the person seeking to gain entrance does not have to be ascertained, although it may be. Only the occurrence of a match between one of the group of enrolled fingerprint templates and the fingerprint minutiae template of the scanned FPI is required. However, in a further embodiment additional conventional identification establishing technologies may be implemented in conjunction with the fingerprint analysis and identification/verification described herein.

Figure 7:
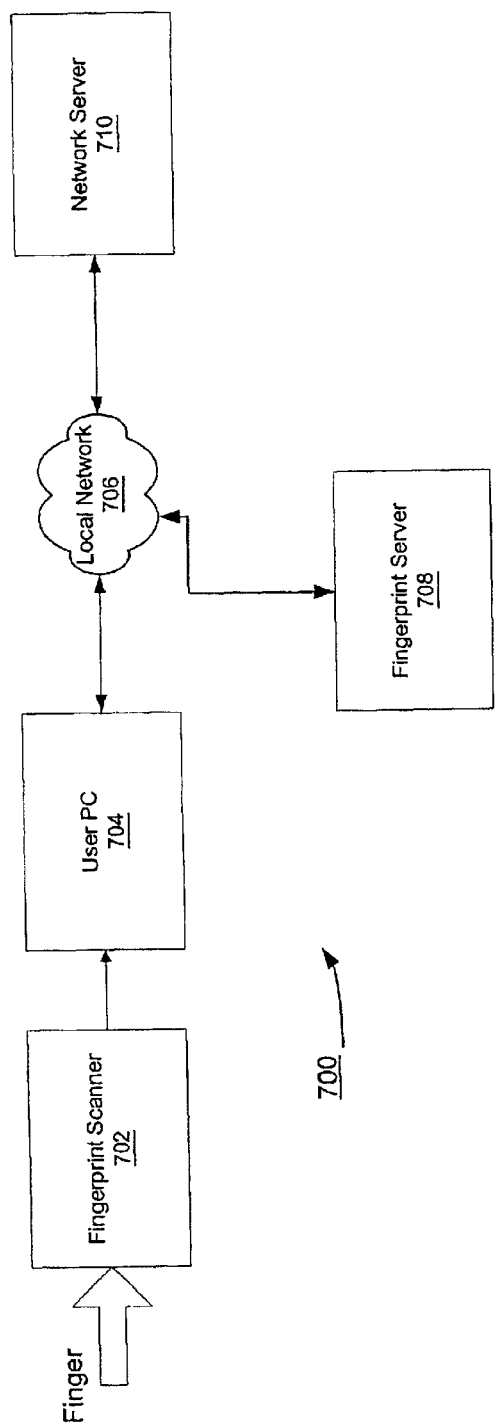
FIG. 7 is a block diagram for a system to control computer network access using the fingerprint analysis methods described herein.

FIG. 7 depicts a block diagram of a network logon control system 700. A fingerprint sensor or scanner 702 coupled to a user PC 704 is used to provide scanned fingerprint data across a data network 706 to a fingerprint server 708. The fingerprint server 708 creates a fingerprint minutiae template of the scanned FPI and compares this template to the previously enrolled fingerprint minutiae templates corresponding to the individuals cleared for access to the computer network. A match between the newly created fingerprint minutiae template and one or more of the previously enrolled fingerprint minutiae templates indicates that the individual is allowed access to the computer network. In addition, the fingerprint server 708 can positively identify the particular individual seeking access and, once verified, provide the identity and the relevant data of the individual to the network server 710.

Figure 8:
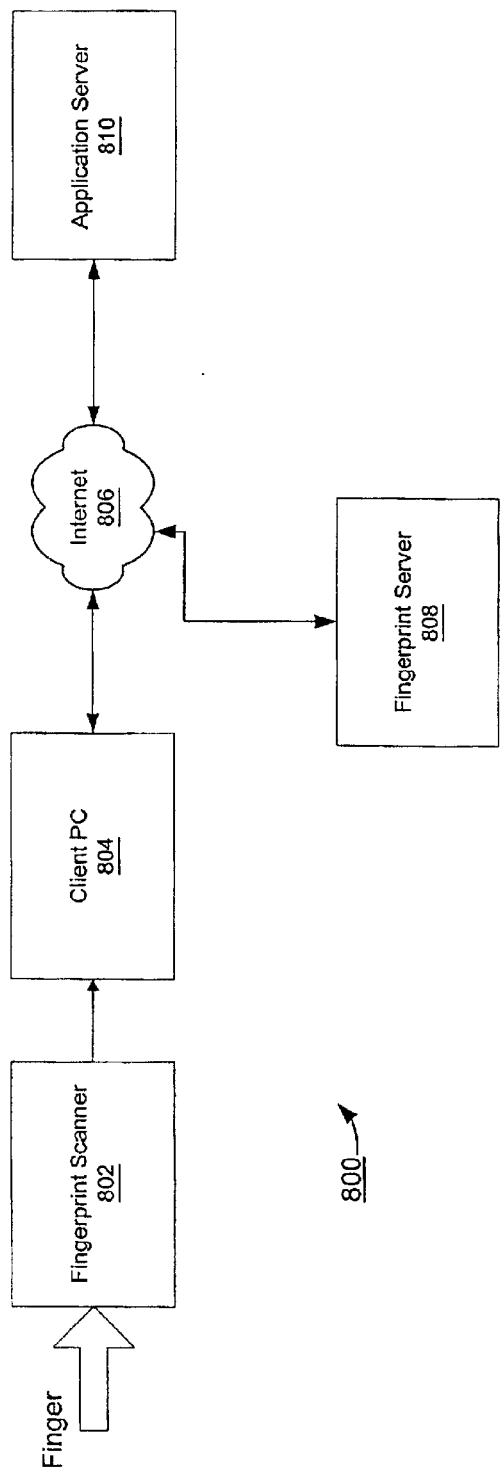
FIG. 8 is a block diagram for a system to control access to a web page across the internet using the fingerprint analysis methods described herein.

FIG. 8 depicts a block diagram of an internet logon control system 800. A fingerprint sensor or scanner 802 coupled to a user PC 804 is used to provide a scanned fingerprint across the internet 806 to a fingerprint server 808 that may be associated with a particular web page or associated with a secure financial transaction that occurs over the internet. The fingerprint server 808 creates a fingerprint minutiae template of the scanned FPI and compares this template to the previously enrolled fingerprint minutiae templates corresponding to the individuals cleared for access to the computer network. A match between the newly created fingerprint minutiae template and the previously enrolled fingerprint minutiae templates indicates that the individual is allowed access to the associated web page or that the financial transaction is properly authorized. In addition, the fingerprint server 808 can positively identify the particular individual seeking access, and once verified, provide the identity of the individual to the application servers 810 along with personal data associated with the particular individual.

Figure 9:
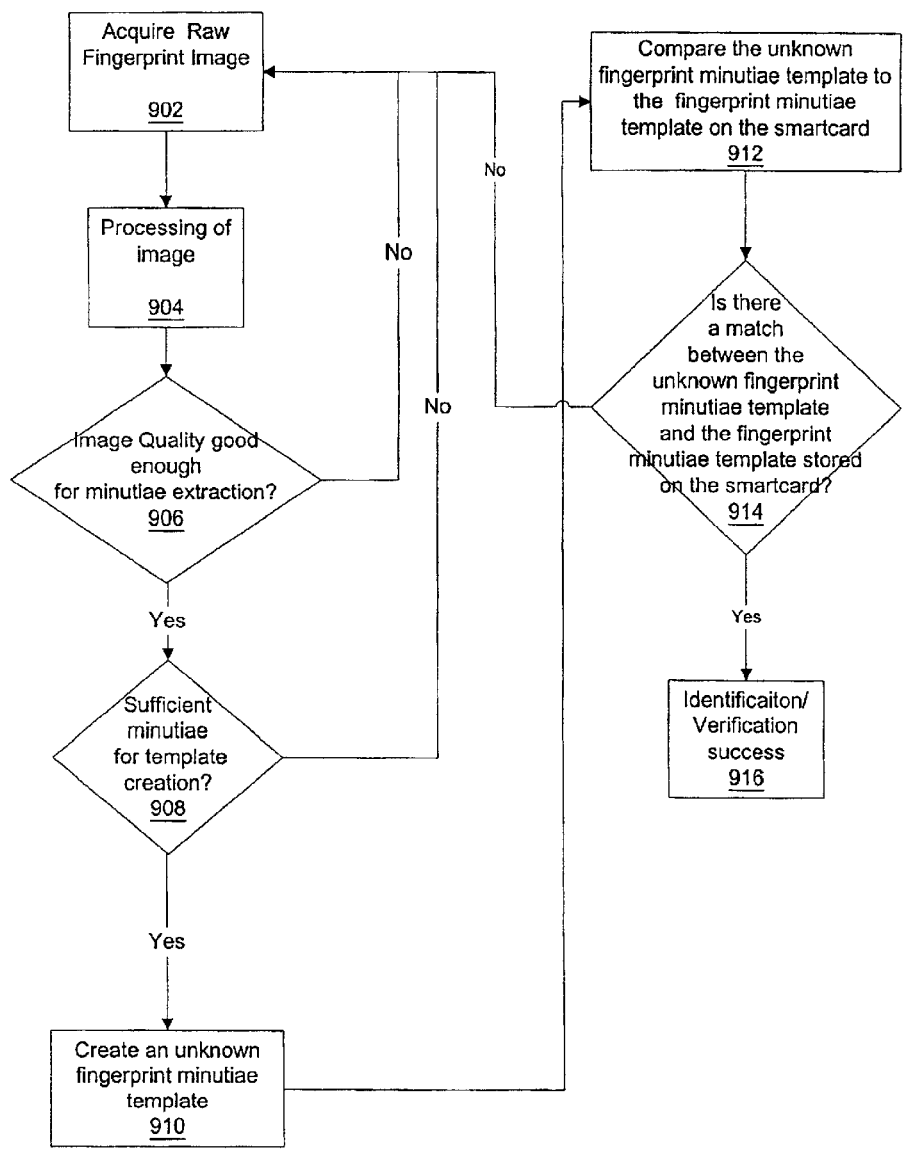
FIG. 9 is a flow chart for a method of using the presently described fingerprint analysis methods in conjunction with a smartcard.

FIG. 9 depicts a flow chart for a method of comparing a fingerprint minutiae template with a fingerprint minutiae template previously stored on a smartcard. A smartcard can be used both at a point of service transaction location or across a network such as the internet to positively identify the individual that is authorized to use the smart card. An FPI is obtained from a fingerprint sensor or scanner, as depicted in step 902. The FPI is processed, as in step 904, and if the image is of sufficient quality, as depicted in step 906 and sufficient minutiae are identified as depicted in step 908. The FPI is analyzed and processed as described above according to FIG. 23 and the minutiae are extracted from the FPI and a fingerprint minutiae template is created, as depicted in step 910. Otherwise, a new FPI is obtained and control is passed to step 902. The extracted minutiae and the fingerprint minutiae template formed from the acquired FPI are compared to the fingerprint minutiae template stored on the smartcard, as depicted in step 912. If a match occurs, as depicted in step 914, the identity of the smartcard holder is verified, as depicted in step 916, otherwise control is passed to step 902, and a new FPI is obtained.

Figure 10:
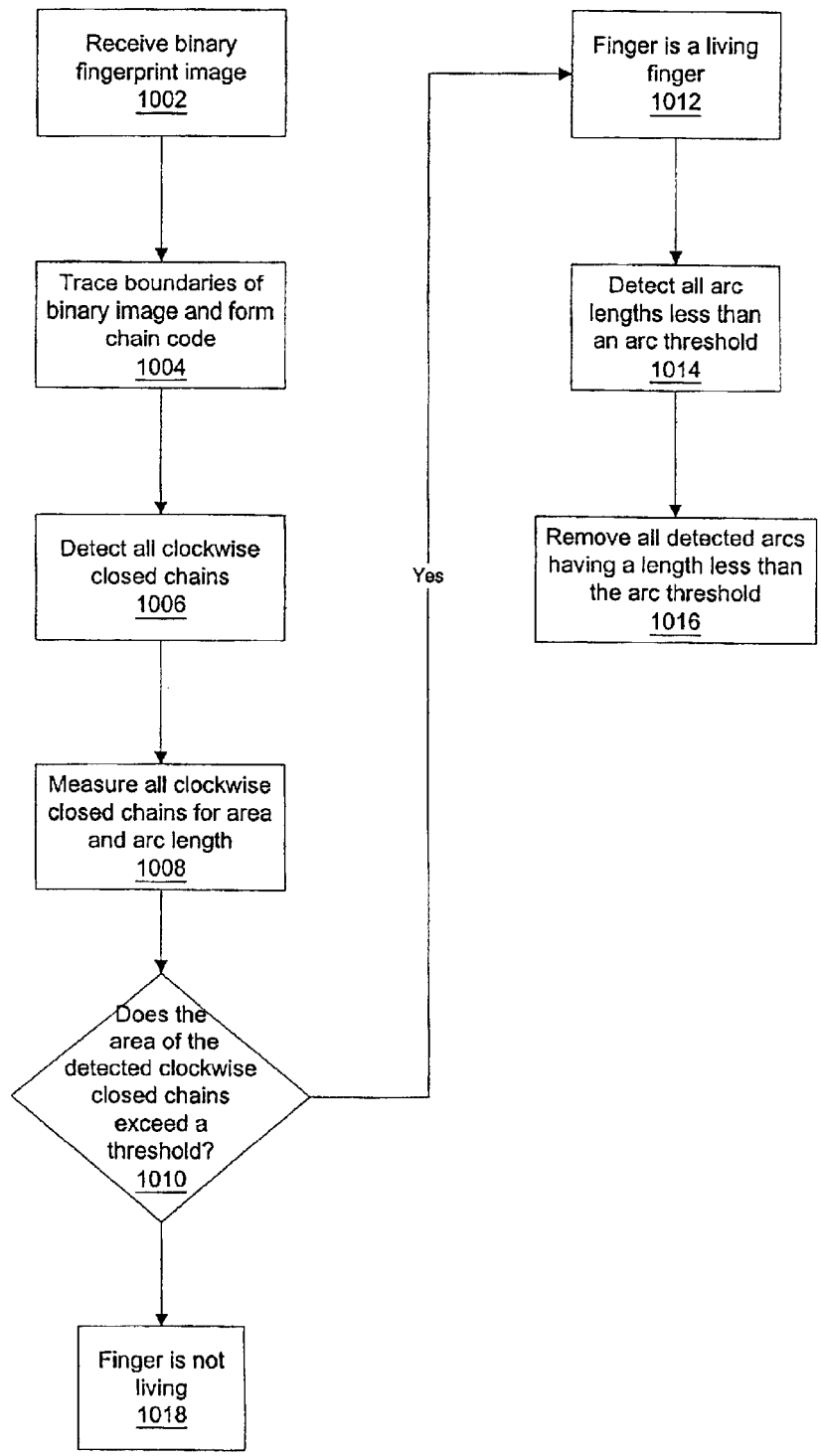
FIG. 10 is a flow chart for a method of detecting a live finger by analyzing the binary fingerprint image.

The verification and identification functions described herein are based on the premise that a finger being presented and scanned by the fingerprint scanner is a live finger and not a prosthetic or severed finger having a false fingerprint. FIG. 10 depicts a flow chart for a live finger detection method that may be used in conjunction with the identification and verification methods described herein. The binary fingerprint image of step 214 in FIG. 2 is further analyzed to detect the presence and size of sweat pores contained within the fingerprint image. The binary image is provided, as depicted in step 1002. The boundaries of the binary image are traced and chain coded, as depicted in step 1004. All clockwise closed chains are detected, as depicted in step 1006, and the area and arc length of the detected closed chains are measured as depicted in step 1008. Although clockwise closed chains are used to identify sweat pores, counter-clockwise closed chains can also be used. The measured area is compared to a sweat pore threshold and if greater than the sweat pore threshold, the closed chain is a detected sweat pore. If the sweat pore exceeds a certain live finger sweat pore threshold, the finger is flagged as live, as depicted in step 1010. In the illustrated embodiment in which the fingerprint sensor/scanner has a 500 dpi resolution, the sweat pore threshold is four pixels. Otherwise, the finger is flagged as non-living and no further processing is employed and the identity of the individual is not confirmed. If the finger is living and the measured arc length is compared to a hole threshold and if less than the hole threshold, the chain is removed, as depicted in step 1012. In this manner, arcs having a arc length less than the hole threshold are considered to be noise and are therefore removed.

Figure 11:
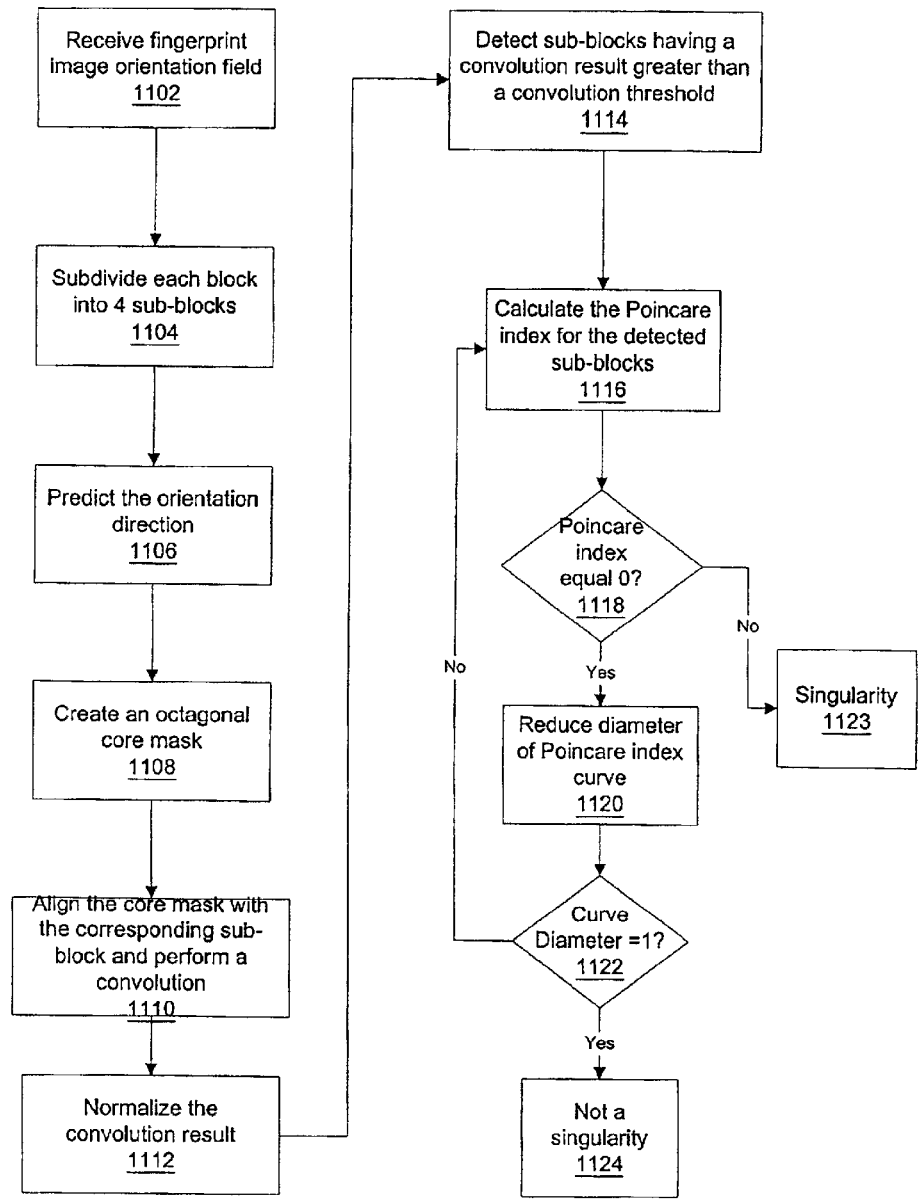
FIG. 11 is a flow chart for a method of detecting and classifying singularities found in the finger print image.

In some circumstances, it may be desirable to classify the FPI according to the location of the cores and deltas, the estimate of the main direction of the cores, and classifying the FPI according to various categories of FPI. FIG. 11 depicts a flow chart of a method of identifying the location of the cores and deltas, estimating the directions, and classifying the FPI. The orientation field corresponding to an FPI from step 210 of FIG. 2 is provided, as depicted in step 1102. The orientation field is refined, as depicted in step 1104 by subdividing each block into a four sub-blocks, as depicted in step 1106. The orientation of each sub-block is predicted, using the original orientation direction as the predictor, as depicted in step 1106. An octagonal core mask is created that is a vector valued 2-dimensional matrix having as a value a unit vector radial from the center of the corresponding sub-block, as depicted in step 1108. The center of the core mask is aligned with the corresponding sub-block and is convolved with the sub-blocks in the FPI, as depicted in step 1110.

The convolution result of the core mask and the sub-blocks is normalized, as depicted in step 1112, and core and delta regions are identified as having large convolution results, i.e. the singularities of the FPI, as depicted in step 1114. The Poincare index is determined for all areas of the FPI having a convolution result greater than a predetermined curve threshold, as depicted in step 1116. The Poincare index is found by surrounding each area by a closed curve and a direction integration is performed. If the direction integration equals zero, as depicted in step 1118, the diameter of the closed curve is reduced, as depicted in step 1120, and the direction integration is performed again. This step is repeated until the radius is one, as depicted in step 1122, or the integration is non-zero, as depicted in step 1118.

The singularities of the FPI are classified according to the value of the corresponding Poincare index, as depicted in step 1116. For a Poincare index of 1, the singularities are classified as whorls and are clustered according to the corresponding Euclidean distance from the arbitrary origin. If there is more than one whorl cluster, the biggest cluster is selected and the smaller clusters are deleted. For a Poincare index of 0.5, the singularities are cores, and are clustered according to the corresponding Euclidean distance from the arbitrary origin. If there are more than three clusters of cores, the largest two are kept and the remaining core clusters are deleted. For a Poincare index of −0.5, the singularities are classified as deltas and are clustered according to the corresponding Euclidean distance from the arbitrary origin. If there is one whorl cluster and 3 or more delta clusters, the largest two delta clusters are kept and the remaining delta clusters are deleted. If there is no whorl cluster and 1 or more delta clusters, the largest two delta clusters are kept and the remaining delta clusters deleted.

For any cores detected in step 1116, the direction of the cores are estimated, as depicted in step 1118. The core mask from step 1106 is convolved with the core singularity and the direction estimated from the results in that the displacement from the core center to the mass center of all zero sub-blocks is along the main direction of the core.

If no cores or whorl clusters are identified then cores near the boundary of the FPI are estimated. The cores near the boundary are estimated by treating as a core singularity sub-blocks near the boundary having a convolution value in the top 20% of values. The cores are processed as described above.

The FPI is then classified as a whorl, right loop, left loop, arch, or double loop. An FPI having a single whorl cluster is classified as a whorl. An FPI having a core cluster, and one or less delta clusters is a loop. If the cross product of the vector from the core to the delta with the main direction of the core is along the normal direction of the fingerprint plane, the fingerprint is a right loop. Otherwise, if the cross product is against the normal, the fingerprint is a left loop. If the cross product is nearly zero, the fingerprint is an arch. If there are two core clusters and two or less delta clusters, the fingerprint is a double loop. If there is no core then the fingerprint is an arch.

In some circumstances, the raw fingerprint images from which one or more fingerprint minutiae templates are formed are obtained from fingerprint scanners or sensors that have different resolutions. Generally, the automated fingerprint identification/verification process described herein assumes that all of the raw FPIs are of the same resolution. Although this may be true for most fingerprint scanners, if the FPI has been previously digitized from film, the resolution information may not have been included with the FPI. Without a-priori knowledge of the resolution of the FPI, extra processing is required to ensure that the images being processed are of similar resolution.

Figure 12:
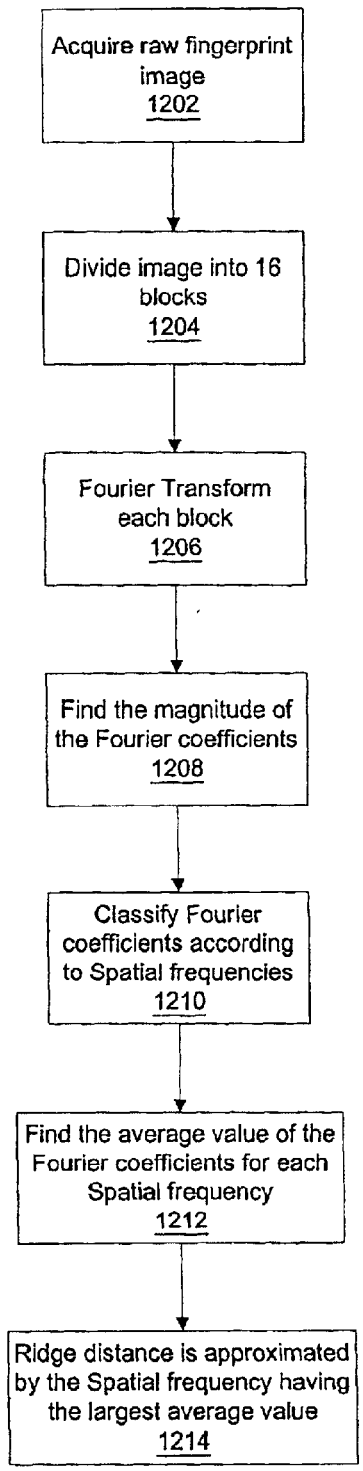
FIG. 12 is a flow chart for a method of estimating the resolution of a raw fingerprint image.

FIG. 12 depicts a method for use with the methods described herein to determine the resolution of an FPI having an unknown resolution. The raw FPI acquired in step 1202 is divided into 16 blocks, as depicted in step 1204. For each block, the Fourier transform is computed as depicted in step 1206. The magnitude of the Fourier coefficients is determined, as depicted in step 1208. The Fourier coefficients are classified according to the corresponding spatial frequency, as depicted in step 1210. The average magnitude of the components for each spatial frequency is determined, as depicted in step 1212. The spatial frequency having the largest average magnitude is an estimation of the ridge distance of the raw FPI, as depicted in step 1214, and may be used to adjust the processing to allow for FPIs of similar resolution to be compared.

Those of ordinary skill in the art should further appreciate that variations to and modification of the above-described methods for identifying and verifying fingerprints can be made. Accordingly, the invention should be viewed as limited solely by the scope and spirit of the appended claims.

What is claimed is:

1. A method for fingerprint recognition, the method comprising the steps of:

acquiring an enrolled fingerprint having a plurality of ridge curves and valleys;

blocking the enrolled fingerprint to form a blocked enrolled fingerprint;

separating enrolled foreground blocks from enrolled background blocks of the blocked enrolled fingerprint thereby forming an enhanced enrolled image;

determining for each of the enrolled foreground blocks in the enhanced enrolled image the corresponding orientation angle and amplitude, thereby forming an orientation field of the enrolled fingerprint;

extracting the minutiae from the orientation field of the enrolled fingerprint by
dividing each of the enrolled foreground blocks into a plurality sub-blocks,
creating a core mask,
convolving each of the sub-blocks of the enrolled foreground blocks with the core mask,
normalizing the results of the convolution of each of the sub-blocks of the enrolled foreground blocks with the core mask,
estimating the curvature in each sub-block as proportional to the convolution of the respective sub-block,
determining Poincare indices of sub-blocks having a curvature that is greater than a predetermined curvature threshold,
grouping the sub-blocks having a curvature that is greater than a predetermined curvature threshold according to the corresponding Poincare index,
identifying the sub-blocks having a curvature that is greater than a predetermined curvature threshold as cores and deltas according to the corresponding Poincare index,
if the estimate of the curvature of a sub-block exceeds a predetermined curvature threshold, surrounding the respective sub-block with a closed curve and calculating the direction integration of the closed curve, and
if the calculated direction integration is substantially zero then reducing the diameter of the closed curve and recalculating the direction integration and continue reducing the diameter of the closed curve until the value of the direction integration is non-zero;

creating an enrolled fingerprint template of the enrolled fingerprint from the extracted minutiae; and storing the enrolled fingerprint template in a database.

2. The method of claim 1 further including:

acquiring an unknown fingerprint;

determining an orientation field of the unknown fingerprint;

extracting the minutiae from the unknown fingerprint;

creating an unknown fingerprint template;

comparing the unknown fingerprint template to the enrolled fingerprint template;

determining the number of the extracted minutiae in the unknown fingerprint template that match the extracted minutiae of the enrolled fingerprint template; and if the number of extracted minutiae that match exceeds a predetermined threshold, providing indicia that the unknown fingerprint and the enrolled fingerprint are a match, otherwise indicate that the unknown fingerprint and the enrolled fingerprint are not a match.

3. The method of claim 1 further including the steps of:

determining an enrolled block size such that the enrolled fingerprint ridge curves can be approximated by parallel straight lines; and blocking the enrolled fingerprint using the enrolled block size in forming the blocked enrolled fingerprint.

4. The method of claim 3 wherein the step of determining the enrolled block size includes determining the enrolled block size according to the formula block_size=$r*16/500$, where r is the resolution of the enrolled fingerprint in dots-per-unit-length.

5. The method of claim 2 further including the steps of:

determining an unknovn fingerprint block size such that the unknown fingerprint ridge curves can be approximated by parallel straight lines; and blocking the unknown fingerprint using the unknown fingerprint block size forming a blocked unknown fingerprint.

6. The method of claim 5 wherein the step of determnining the unknown fingerprint block size includes determining the unknown fingerprint block size according to the formula block_size=$r*16/500$, where r is the resolution of the unknown fingerprint in dots-per-unit-length.

7. The method of claim 1 wherein the step of separating the enrolled foreground blocks from the enrolled background blocks of the blocked enrolled fingerprint includes the steps of:

calculating for each block in the blocked enrolled fingerprint the mean and variance of the pixel gray level within the block;

selecting as an enrolled foreground block each block having a variance that is less than a predetermined variance threshold and a mean that is greater than a predetermined mean threshold;

determining an enrolled convex hull defined by the centers of each block selected to be an enrolled foreground block;

testing each block not selected as an enrolled foreground block whether the center of the block is within the enrolled convex hull; and in the event that the center of the block being tested is within the enrolled convex hull, selecting the block being tested as an enrolled foreground block.

8. The method of claim 2 further including the steps of:
blocking the unknown fingerprint to form a blocked unknown fingerprint; and
separating unknown fingerprint foreground blocks from unknown fingerprint background blocks of the blocked unknown fingerprint forming an enhanced unknown fingerprint image.

9. The method of claim 8 wherein the step of separating the unknown fingerprint foreground blocks from the unknown fingerprint background blocks of the blocked unknown fingerprint includes the steps of:
calculating for each block the mean and variance of the pixel gray level within the block;
selecting as an unknown fingerprint foreground block each block having a variance that is less than a predetermined variance threshold and a mean that is greater than a predetermined mean threshold;
determining an unknown fingerprint convex hull defined by the centers of each block selected to be an unknown fingerprint foreground block;
testing each block not selected as an unknown fingerprint foreground block whether the center of the block is within the unknown fingerprint convex hull; and
in the event that the center of the block being tested is within the unknown fingerprint convex hull, selecting the block being tested as an unknown fingerprint foreground block.

10. The method of claim 1 further including filtering each of the enrolled foreground blocks.

11. The method of claim 10 wherein the step of filtering each of the enrolled foreground blocks includes filtering each of the enrolled foreground blocks with a low pass filter.

12. The method of claim 11 wherein the step of filtering each of the enrolled foreground blocks with a low pass filter includes filtering using a low pass Gaussian filter.

13. The method of claim 8 further including filtering each of the unknown fingerprint foreground blocks.

14. The method of claim 13 wherein the step of filtering each of the unknown fingerprint foreground blocks includes filtering each of the unknown fingerprint foreground blocks with a low pass filter.

15. The method of claim 14 wherein the step of filtering each of the unknown fingerprint foreground blocks with a low pass filter includes filtering using a low pass Gaussian filter.

16. The method of claim 1 wherein the step of determining the orientation angle and amplitude for each of the enrolled foreground blocks in the enhanced enrolled image includes finding the horizontal partial derivative and the vertical partial derivative for each of the enrolled foreground blocks.

17. The method of claim 16 wherein the step of finding the horizontal partial derivative and the vertical partial derivative for each of the enrolled foreground blocks includes using a Sobel differential operator.

18. The method of claim 16, in the event that the orientation amplitude is less than a predetermined amplitude constant, further includes the steps of:
selecting a plurality of directions equally spaced about a unit circle;
calculating the average gray level and standard deviation gray level curve projected along each selected direction of the respective enrolled foreground block; and
selecting the orientation angle to be the one of the selected directions having the smallest standard deviation gray level curve.

19. The method of claim 8 further including the step of determining for each of the unknown fingerprint foreground blocks in the enhanced unknown fingerprint image the corresponding orientation angle and amplitude forming an unknown fingerprint orientation field of the unknown fingerprint.

20. The method of claim 19 wherein the step of determining the orientation angle and amplitude for each of the unknown fingerprint foreground blocks in the enhanced unknown fingerprint image includes finding the horizontal partial derivative and the vertical partial derivative for each of the unknown fingerprint foreground blocks.

21. The method of claim 20 wherein the step of finding the horizontal partial derivative and the vertical partial derivative for each of the unknown fingerprint foreground blocks includes using a Sobel differential operator.

22. The method of claim 20, in the event that the orientation amplitude is less than a predetermined amplitude constant, further includes the steps of:
selecting a plurality of directions equally spaced about a unit circle;
calculating the average gray level and standard deviation gray level curve projected along each selected direction of the respective unknown fingerprint foreground block; and
selecting the orientation angle to be the one of the selected directions having the smallest standard deviation gray level curve.

23. The method of claim 1 further including the steps of:
creating a directional filter for filtering a respective one of the enrolled foreground blocks in the enrolled orientation field as a function of the orientation angle and amplitude of the respective enrolled foreground block, wherein the directional filter increases the contrast between ridges and valleys in the enrolled fingerprint orientation field along the same orientation direction as the respective enrolled foreground block; and
applying the respective directional filter to each of the enrolled foreground blocks to be filtered forming a ridge-enhanced enrolled image.

24. The method of step 23 wherein the step of creating the directional filter includes creating a filter mask having predetermined coefficients that are a function of the corresponding foreground block to be filtered.

25. The method of step 25 wherein the step of creating the filter mask includes the steps of:
creating a square filter mask having a length equal to the period of the signal or the period of the signal plus one whichever is an odd number; and
determining the coefficients of the filter mask.

26. The method of claim 25 wherein the step of determining the coefficients of the filter mask includes the steps of;
setting the center coefficient of the center row to a value $a_0$;
setting the first and last coefficients of the center row to a value of $a_0/4$;
calculating the coefficients of the center row between the center coefficient and the first and last coefficients according to a cosine function and the difference between $a_0$ and $a_0/4$;
determining a number of middle rows on each side of the center row needed to adequately enhance the contrast between ridges and valleys in the fingerprint image, wherein the number of middle rows is an even number;

determining the coefficients of the middle rows according to a cosine taper function between the center coefficient, $c_i$ and $c_i/1.41$; and determining the values, $b_i$, of the top and bottom rows of the filter mask as $$b_i = \left(-\sum_{j=1,n} a_{i,j}\right) * \frac{1}{2},$$

where $b_i$ is the $i^{th}$ coefficient of the first and last rows of the mask, $a_{i,j}$ is the value of the $i^{th}$ coefficient of the $j^{th}$ row in a set comprised of the middle rows and the center row, where there are n rows in the set, and n is an odd number.

27. The method of claim 19 further including the steps of:
creating a directional filter for filtering one of the unknown fingerprint foreground blocks in the unknown fingerprint orientation field as a function of the orientation angle and amplitude of the respective unknown fingerprint foreground block, wherein the directional filter increases the contrast between ridges and valleys in the unknown fingerprint orientation field along the same orientation direction as the respective unknown fingerprint foreground block; and applying the respective directional filter to each of the unknown fingerprint foreground blocks to be filtered forming a ridge-enhanced unknown fingerprint image.

28. The method of step 27 wherein the step of creating the directional filter includes creating a filter mask having predetermined coefficients that are a function of the corresponding foreground block to be filtered.

29. The method of step 28 wherein the step of creating the filter mask includes the steps of:
creating a square filter mask having a length equal to the period of the signal or the period of the signal plus one whichever is an odd number; and determining the coefficients of the filter mask.

30. The method of claim 29 wherein the step of determining the coefficients of the filter mask includes the steps of:
setting the center coefficient of the center row to a value $a_0$;

setting the first and last coefficients of the center row to a value of $a_0/4$;

calculating the coefficients of the center row between the center coefficient and the first and last coefficients according to a cosine function and the difference between $a_0$ and $a_0/4$;

determining a number of middle rows on each side of the center row needed to adequately enhance the contrast between ridges and valleys in the fingerprint image, wherein the number of middle rows is an even number;

determining the coefficients of the middle rows according to cosine taper function between the center row coefficient, $c_I$, and $c_i/1.41$; and determining the values, $b_i$, of the top and bottom rows of the filter mask as $$b_i = \left(-\sum_{j=1,n} a_{i,j}\right) * \frac{1}{2},$$

where $b_i$ is the $i^{th}$ coefficient of the first and last rows of the mask, $a_{i,j}$ is the value of the $i^{th}$ coefficient of the $j^{th}$ row in a set comprised of the middle rows and the center row, where there are n rows in the set, and n is an odd number.

31. The method of claim 23 further including the steps of:
determining a binarization threshold; and applying the binarization threshold to each pixel in the ridge-enhanced enrolled image forming a binary enrolled image, wherein if a pixel value in the ridge-enhanced enrolled image is less than the binarization threshold, the pixel value is set to zero, and if a pixel value in the ridge-enhanced enrolled image is greater than or equal to the binarization threshold, the pixel value is set to one.

32. The method of claim 31 wherein the step of determining the binarization threshold includes setting the binarization threshold to one-half the maximum intensity value of the respective pixel.

33. The method of claim 27 further including the steps of:
determining a binarization threshold; and applying the binarization threshold to each pixel in the ridge-enhanced unknown fingerprint image forming a binary unknown fingerprint image, wherein if a pixel value in the ridge-enhanced unknown fingerprint image is less than the binarization threshold, the pixel value is set to zero, and if a pixel value in the ridge-enhanced unknown fingerprint image is greater than or equal to the binarization threshold, the pixel value is set to one.

34. The method of claim 33 wherein the step of determining the binarization threshold includes setting the binarization threshold to one-half the maximiazn intensity value of the respective pixel.

35. The method of claim 31 further including the step of reducing the width of a ridge curve contained within the binary enrolled image to a single pixel width forming a thinned binary enrolled image.

36. The method of claim 33 further including the step of reducing the width of a ridge curve contained within the binary unknown fingerprint image to a single pixel width forming a thinned binary unknown fingerprint image.

37. The method of claim 35 further including the step of approximating each ridge curve in the thinned binary enrolled image by a piecewise linear approximation forming a piecewise linear reduced binary enrolled image.

38. The method of claim 37 wherein the step of approximating each ridge curve in the thinned binary enrolled image by a piecewise linear approximation includes:
finding the starting and ending points of a ridge curve in the thinned binary enrolled image;

forming a line segment between the starting and ending points of the respective ridge curve;

measuring the maximum distance between the line segment and the respective ridge curve; and if the maximum distance between the line segment and the respective ridge curve is greater than a predetermined error threshold, form a first line sub-segment between the starting point of the respective ridge curve and the point of the respective ridge curve having the maximum distance from the line segment and form a second line sub-segment between the starting point of the respective ridge curve having the maximum distance from the line segment and the ending point of the respective ridge curve.

39. The method of claim 36 further including the step of approximating each ridge curve in the thinned binary unknown fingerprint image by a piecewise linear approximation forming a piecewise linear reduced binary unknown fingerprint image.

40. The method of claim 39 wherein the step of approximating each ridge curve in the thinned binary unknown fingerprint image by a piecewise linear approximation includes:
finding the starting and ending points of a ridge curve in the thinned binary unknown fingerprint image;
forming a line segment between the starting and ending points of the respective ridge curve;
measuring the maximum distance between the line segment and the respective ridge curve; and
if the maximum distantce between the line segment and the respective ridge curve is greater than a predetermined error threshold, form a first line sub-segment between the starting point of the respective ridge curve and the point of the respective ridge curve having the maximum distance from the line segment and form a second line sub-segment between the starting point of the respective ridge curve having the maximum distance from the line segment and the ending point of the respective ridge curve.

41. The method of claim 37 further including the step of extracting the minutiae from the piecewise linear reduced binary enrolled image to provide enrolled minutiae.

42. The method of claim 41 wherein the step of extracting the miriutiae includes:
calculating a crossing number corresponding to each ridge pixel contained within the piecewise linear reduced binary enrolled image; and
determining the type of pixel as a function of the corresponding crossing number.

43. The method of claim 42 wherein the step of calculating the crossing number includes calculating the crossing number according to $$CN = \left( \frac{1}{2} \sum_{i=1...7} |P_i - P_{i+1}| \right),$$

where $P_i$ and $P_{i+1}$ are the pixels surrounding the respective ridge pixel P.

44. The method of claim 43 wherein the step of determining the type of pixel includes the steps of:
if the crossing number equals 0 the pixel is an isolated point;
if the crossing number equals 1 the pixel is an end point;
if the crossing number equals 2 the pixel is a continuing point;
if the crossing number equals 3 the pixel is a branching point; and
if the crossing number equals 4 the pixel is a crossing point.

45. The method of claim 39 further including the step of extracting the minutiae from the piecewise linear reduced binary unknown fingerprint image to provide unknown fingerprint minutiae.

46. The method of claim 45 wherein the step of extracting the minutiae includes:
calculating a crossing number corresponding to each ridge pixel contained within the piecewise linear reduced binary unknown fingerprint image; and
determining the type of pixel as a function of the corresponding crossing number.

47. The method of claim 46 wherein the step of calculating the crossing number includes calculating the crossing number according to $$CN = \left( \frac{1}{2} \sum_{i=1...7} |P_i - P_{i+1}| \right),$$

where $P_i$ and $P_{i+1}$ are the pixels surrounding the respective ridge pixel P.

48. The method of claim 46 wherein the step of determining the type of pixel includes the steps of:
if the crossing number equals 0 the pixel is an isolated point;
if the crossing number equals 1 the pixel is an end point;
if the crossing number equals 2 the pixel is a continuing point;
if the crossing number equals 3 the pixel is a branching point; and
if the crossing number equals 4 the pixel is a crossing point.

49. The method of claim 41 further including the step of removing false minutiae from the enrolled minutiae to form reduced enrolled minutiae.

50. The method of claim 45 further including the step of removing false minutiae from the unknown fingerprint minutiae to form reduced unknown fingerprint minutiae.

51. The method of claim 49 further including the step of creating an enrolled minutiae template using the reduced enrolled minutiae.

52. The method of claim 51 wherein the step of creating an enrolled minutiae template includes creating a connected graph of the reduced enrolled minutiae.

53. The method of claim 52 wherein the step of creating the connected graph includes the steps of:
for each of the reduced enrolled minutiae, forming an enrolled segment betweend the respective reduced enrolled minutiae and each of the other reduced enrolled minutiae that is within a predetermined distance.

54. The method of claim 53 further including the steps of:
determining the intersection point between each enrolled segment and each ridge curve intersected by the respective enrolled segment; and
determining the intersection angle between each enrolled segment and the tangential direction of the intersected ridge curve.

55. The method of claim 50 further including the step of creating an unknown fingerprint minutiae template using the reduced unknown fingerprint minutiae.

56. The method of claim 55 wherein the step of creating an unknown fingerprint minutiae template includes creating a connected graph of the reduced unknown fingerprint minutiae.

57. The method of claim 56 wherein the step of creating the connected graph includes the steps of:
for each of the reduced unknown fingerprint minutiae, forming an unknown fingerprint segment between the respective reduced unknown fingerprint minutiae and each of the other reduced unknown fingerprint minutiae that is within a predetermined distance.

58. The method of claim 57 further including the steps of:
determining the intersection point between each unknown fingerprint segment and each ridge curve intersected by the respective unknown fingerprint segment; and
determining the intersection point angle between each unknown fingerprint segment and the tangential direction of the intersected ridge curve.

59. The method of claim 2 wherein the step of comparing the unknown fingerprint template to the enrolled fingerprint template includes the steps of:
 a) finding a matching pair of nodes in the enrolled fingerprint template and the unknown fingerprint template;
 b) determining a template transformation to translate and rotate the unknown fingerprint template to align the unknown and enrolled fingerprint templates;
 c) using the template transformation, transforming an unknown fingerprint minutiae in the neighborhood of the matching node pairs in the unknown fingerprint template to the enrolled fingerprint template;
 d) computing the difference between the transformed unknown fingerprint minutiae and an enrolled minutiae;
 e) if the difference between the transformed unknown fingerprint minutiae and the enrolled minutiae is less than a predetermined threshold, count the transformed unknown fingerprint minutiae and the enrolled minutiae as matched; and
 f) in the event that there is more than one unknown fingerprint minutiae in the neighborhood of the matching node pair in the unknown fingerprint minutiae template and there is more than one enrolled minutiae in the neighborhood of the matching node pair in the enrolled minutiae template repeat the step of computing the difference and comparing the difference to the predetermined threshold for each of the unknown fingerprint minutiae.

60. The method of claim 59, further including the steps of:
 in the event that more than one matching node pair is found, repeating the steps a–f for each matching node pair; and
 selecting the matching node pair having the greatest number of matched unknown and enrolled minutiae.

61. The method of claim 33 further including the step of detecting a living finger.

62. The method of claim 61 wherein the step of detecting a living finger includes detecting the characteristic of a sweat pore contained within the binary unknown fingerprint image.

63. The method of claim 62 wherein the step of detecting the characteristic of a sweat pore includes:
 forming a chain code of the boundaries in the binary unknown fingerprint image;
 finding all clockwise closed chains;
 measuring the closed chains; and
 if the size of a closed chain exceeds a predetermined sweat pore threshold the closed chain is identified as a sweat pore in a living finger.

64. The method of claim 2 wherein, in the event that the unknown fingerprint and the enrolled fingerprint are a match, providing access to a secured entity.

65. The method of claim 64 wherein the secured entity is a computer.

66. The method of claim 64 wherein the secured entity is a computer network.

67. The method of claim 64 wherein the secured entity is data contained in a smartcard.

68. The method of claim 64 wherein the secured entity is a cryptographic key.

* * * * *